United States Patent [19]

Enari

[11] Patent Number: 5,565,991
[45] Date of Patent: Oct. 15, 1996

[54] DECODING APPARATUS

[75] Inventor: Masahiko Enari, Yokohama, Japan

[73] Assignee: Canon Kabushiki Kaisha, Tokyo, Japan

[21] Appl. No.: 371,496

[22] Filed: Jan. 11, 1995

Related U.S. Application Data

[63] Continuation of Ser. No. 5,356, Jan. 19, 1993, abandoned.

[30] Foreign Application Priority Data

Jan. 20, 1992 [JP] Japan ..................... 4-007442

[51] Int. Cl.$^6$ ..................................... H04N 1/44
[52] U.S. Cl. .................. 358/261.1; 358/426; 358/433
[58] Field of Search .......................... 358/261.1, 261.3, 358/426, 427, 261.4, 431, 261.2, 432, 433, 430; 341/67, 65, 63, 94, 51; 382/245, 246, 233; 375/122, 27; 348/390, 384, 420, 405; 371/37.8, 37.1, 47.1, 57.2, 67.1

[56] References Cited

U.S. PATENT DOCUMENTS

| | | | |
|---|---|---|---|
| 4,737,765 | 4/1988 | Minuhin | 341/67 |
| 4,813,056 | 3/1989 | Fedele | 375/122 |
| 4,903,269 | 2/1990 | Fedele | 358/261.1 |
| 5,218,622 | 6/1993 | Fazel et al. | 375/122 |

FOREIGN PATENT DOCUMENTS

| | | |
|---|---|---|
| 0436251 | 7/1991 | European Pat. Off. . |
| 0493128 | 7/1992 | European Pat. Off. . |
| 62-118642 | 5/1987 | Japan . |
| 1049429 | 2/1989 | Japan . |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A decoding circuit in which the data error does not propagate to the next DCT block. In response to a reset signal for a decoding process, a down-counter reads a process number set in a process number setting unit, and counts down the process number according to the entered clock pulses. A comparator compares the count of the down-counter and the non-zero/zero-run mixed data from a lookup table, and releases an A<B flag in case the latter is larger. The A<B flag is supplied to a first OR gate and a NAND gate, and, if it is an H-level, forcedly shifts the non-zero/zero-run flag to the H-level and sends the flag to an up-counter 8 and a second OR gate. At the same time the outputs of the NAND gate and the first OR gate are logically multiplied and sent to an AND gate group, which replaces the zero-run data with non-zero data "0".

10 Claims, 6 Drawing Sheets

FIG. 1

FIG. 2A CLK
FIG. 2B RESET SIGNAL
FIG. 2C OUTPUT OF DOWN-COUNTER
FIG. 2D NON-ZERO/ZERO-RUN MIXED DATA
FIG. 2E NON-ZERO/ZERO-RUN FLAG
FIG. 2F A<B FLAG
FIG. 2G DECODE OUTPUT DATA

FIG. 3
PRIOR ART

FIG. 4A CLK
FIG. 4B INPUT ENCODE DATA
FIG. 4C NON-ZERO/ZERO-RUN MIXED DATA
FIG. 4D NON-ZERO/ZERO-RUN FLAG
FIG. 4E COUNTER OUTPUT
FIG. 4F ZERO-PERIOD END FLAG
FIG. 4G DECODE OUTPUT DATA

FIG. 5

| | NON-ZERO | ZERO-RUN |
|---|---|---|
| 0* (2) | ± 1 | |
| 1*0* (4) | ± 2 | 1∼2 |
| 1*1*0* (6) | ± 3∼4 | 3∼4, EOB |
| 1*1*1*0* (8) | ± 5∼8 | 5∼12 |
| 1*1*1*1*0* (10) | ± 9∼16 | 13∼28 |
| 1*1*1*1*1*0* (12) | ±17∼30 | 29∼63 |
| 1*1*1*1*1*1*** (14) | ±31∼127 | |

NOTE : NUMERALS···ENLARGED CODE
      * ···INFORMATION CODE
   ( ) ···CODE LENGTH

FIG. 6

| NON-ZERO/ZERO-RUN MIXED DATA | NON-ZERO/ZERO-RUN FLAG |
|---|---|
| 10 | NON-ZERO |
| 7 | NON-ZERO |
| 104 | NON-ZERO |
| 3 | ZERO-RUN |
| 6 | NON-ZERO |
| 3 | NON-ZERO |
| 2 | NON-ZERO |
| 1 | NON-ZERO |
| ⋮ | ⋮ |

DECODING APPARATUS

This application is a continuation of application Ser. No. 08/005,356 filed Jan. 19, 1993, abandoned.

BACKGROUND OF THE INVENTION

1. Field of the Invention

The present invention relates to a decoding apparatus, and more particularly a decoding apparatus for decoding, for example, a variable-length encoded image.

2. Related Background Art

Among various methods proposed for high efficiency encoding, the so-called hybrid DCT method according to the CMTT/2 Recommendation 723 is known as the representative high efficiency encoding method in the field of images. Also B2 code is proposed as the variable-length codes for these encoding methods. These encoding methods and the B2 code are detailedly described by Y. Ohtsuka, "Encoding technologies for current television and HDTV", J. of Television Association, Vol. 45, No. 7, pp. 800–802(1991).

In said hybrid DCT method, for the non-zero coefficients and the zero-run value, the B2 code transmits expansion codes and information codes alternately, taking two bits as a pair, with an expansion code "0" as a partition (stop code). However the stop code is not transmitted only in case of the maximum code length. Also shorter codes are assigned to the non-zero coefficients and the zero-run value, in the descending order of the frequency of appearance thereof.

The B2 code has a feature that the expansion code and the information code have clear positions. If the expansion code is erroneous, there may result a phenomenon that a code appears as two codes or two codes appear as a code, but the error does not propagate to the next DCT block, as long as an EOB code, indicating that all the subsequent coefficients are zero to the end of the DCT block, is properly detected.

Figure 3:
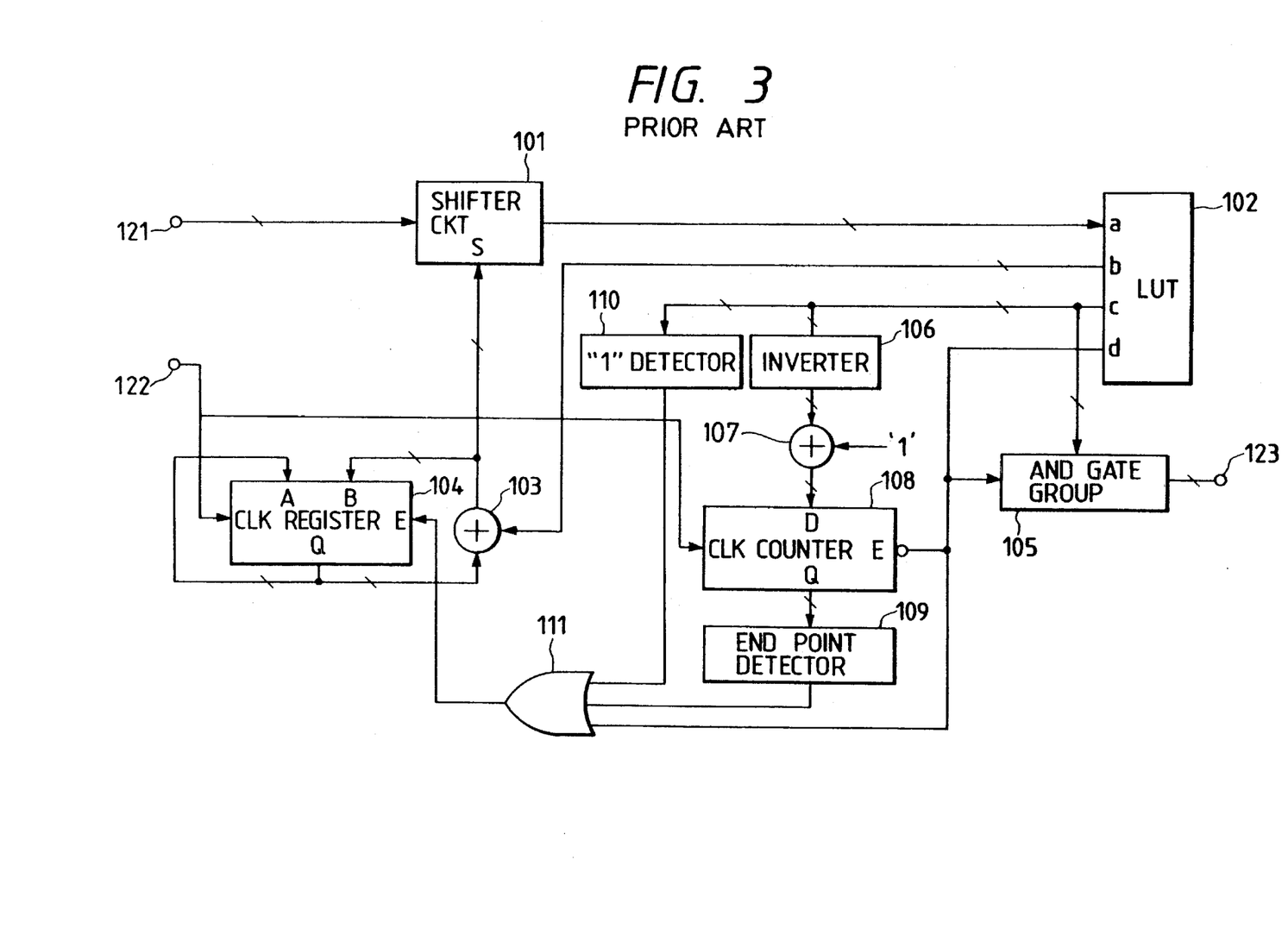
FIG. 3 is a block diagram of a conventional variable-length decoding circuit.
Figure 5:
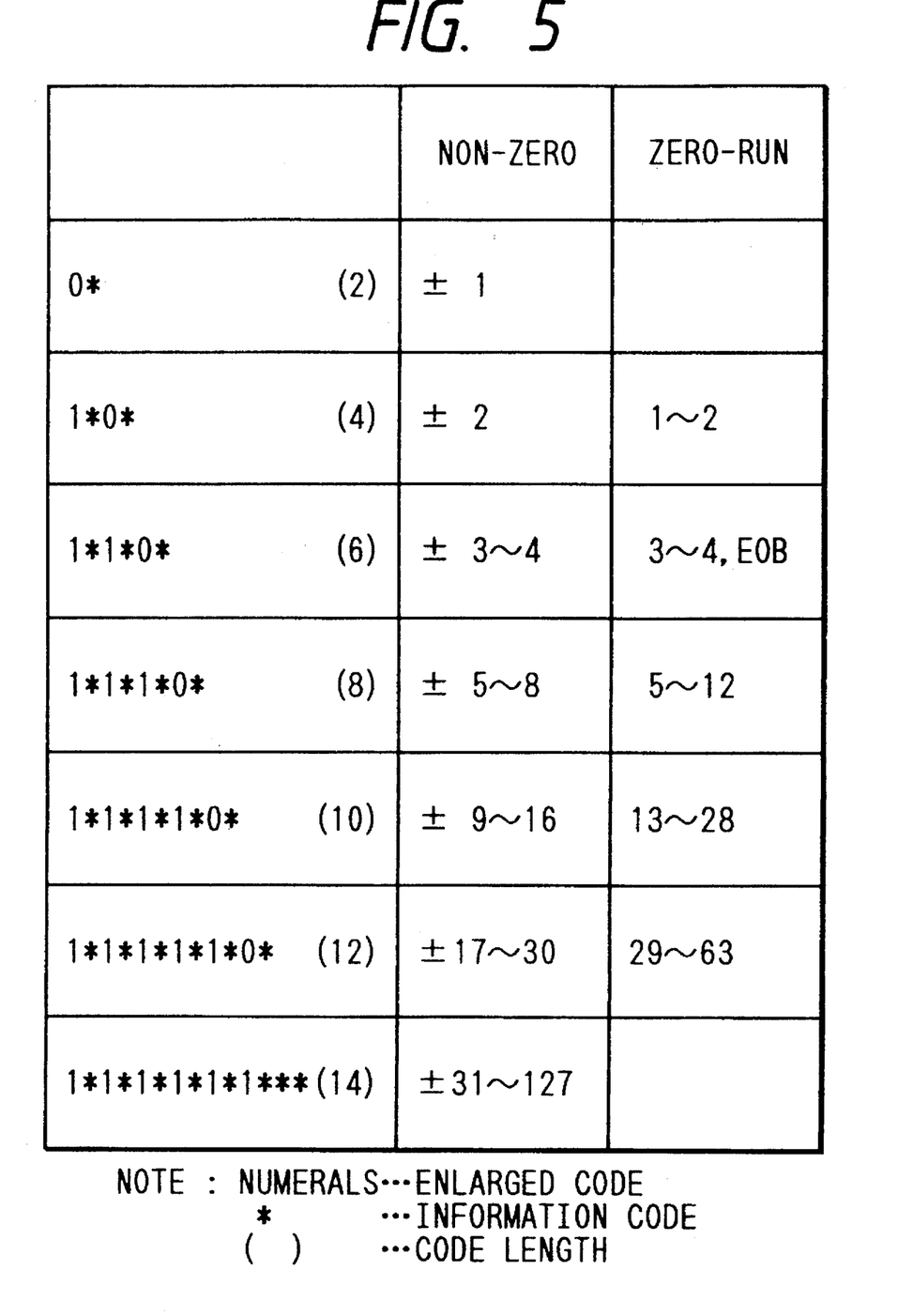
FIG. 5 is a view showing an example of B2 code.

FIG. 5 shows an example of the B2 code, and FIG. 3 shows a conventional variable-length decoding circuit for decoding the codes which are variable-length encoded by the B2 code system.

Referring to FIG. 3, a data input terminal 121 receives data, in the form of a word of a predetermined bit width, including codes from two bits at minimum to the maximum code bit length, encoded in the B2 code system.

A terminal 122 receives the clock signal, and a data output terminal 123 releases the variable-length decoded data.

The B2 code data, entered from the data input terminal 121, are supplied to a shifter circuit 101, and are released therefrom with a shift to the leading bit of the B2 code. The shifter circuit 101 is provided with an input terminal S for the shift amount.

The output of the shifter circuit 101 is supplied to a terminal a of a look-up table (LUT) 102, of which a terminal b releases the B2 code length, while a terminal c releases non-zero (meaning quantized coefficient (including "0"))/zero-run mixed data, and a terminal d releases a non-zero/zero-run flag.

The B2 code length released from the LUT 102 and the cumulative bit number of the B2 code lengths, until the immediately preceding clock signal, stored in a register 104 are added in a adder 103, and the cumulative sum released therefrom is supplied to the terminal S of the shifter circuit 101.

When the non-zero/zero-run flag from the LUT 102 is at the H-level, the non-zero/zero-run mixed data from the LUT 102 are transmitted through an AND gate group 105 and released from the data output terminal 123.

When the non-zero/zero-run flag from the LUT 102 is at the L-level, the outputs from the data output terminal 123 are made all zero by the ABD gate group 105. In this case, the non-zero/zero-run mixed data indicate the zero-run value, which are subjected to bit invention in an inverter 106 and an addition of "1" in an adder 107, and are supplied to a terminal D of a counter 108.

In case the non-zero/zero-run flag, supplied to a terminal E thereof, is at the L-level, the counter 108 effects uncounting operation in response to the clock signal supplied to a terminal C. The output of the counter 108 is supplied to an end detector 109.

The output (zero period end flag) of the end detection circuit 109, the result of detection of the zero-run value "1" released from a "1" detector 110, and the non-zero/zero-run flag are subjected to logic summation in an OR gate 111, of which output is supplied to a terminal E of a register 104.

When said terminal E of the register 104 is at the H-level, the register selects a terminal A for input, and renews the cumulative bit number. When said terminal E is at the L-level, a terminal B is selected and the cumulative bit number is retained.

FIGS. 4A to 4G are timing charts showing the functions of the conventional variable-length decoding circuit.

Figure 4A:
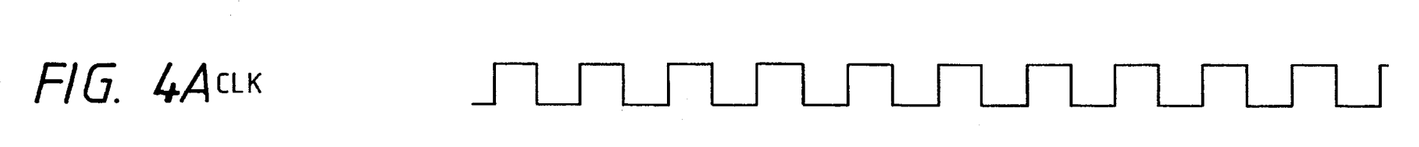
FIGS. 4A to 4G are timing charts showing the function of the conventional variable-length decoding circuit.
Figure 4B:
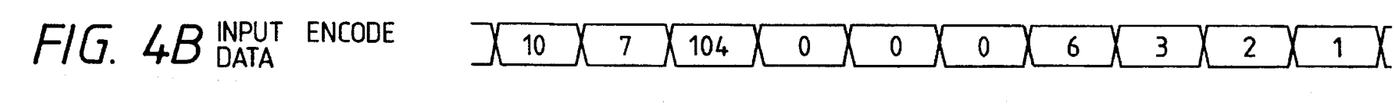
Figure 4C:
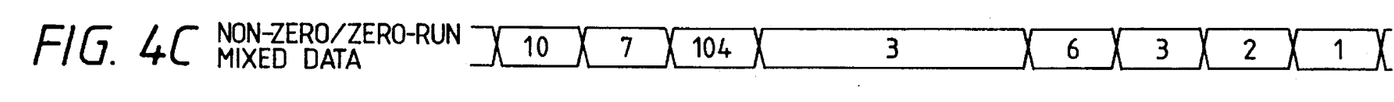
Figure 4D:
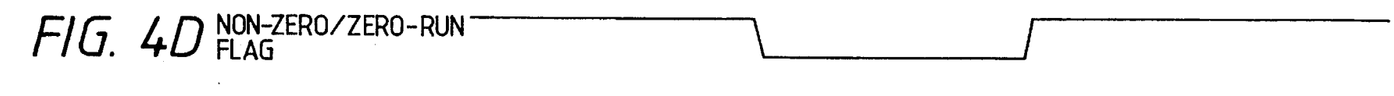
Figure 4E:
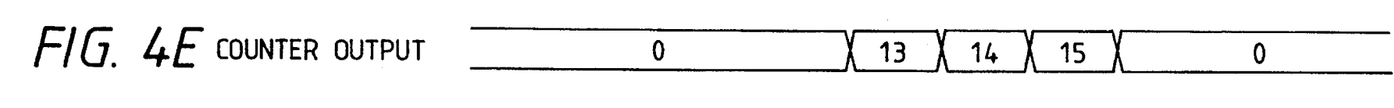
Figure 4F:
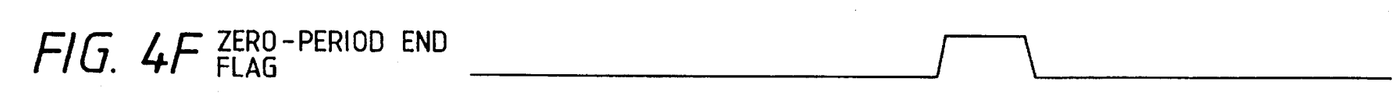
Figure 4G:
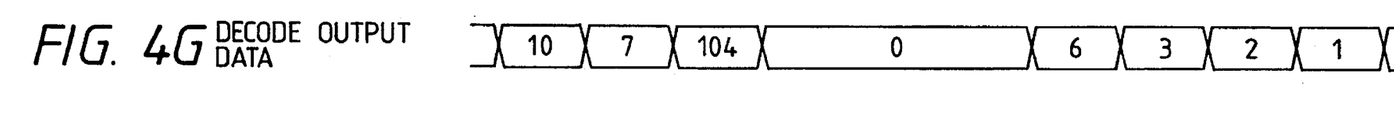
Figure 6:
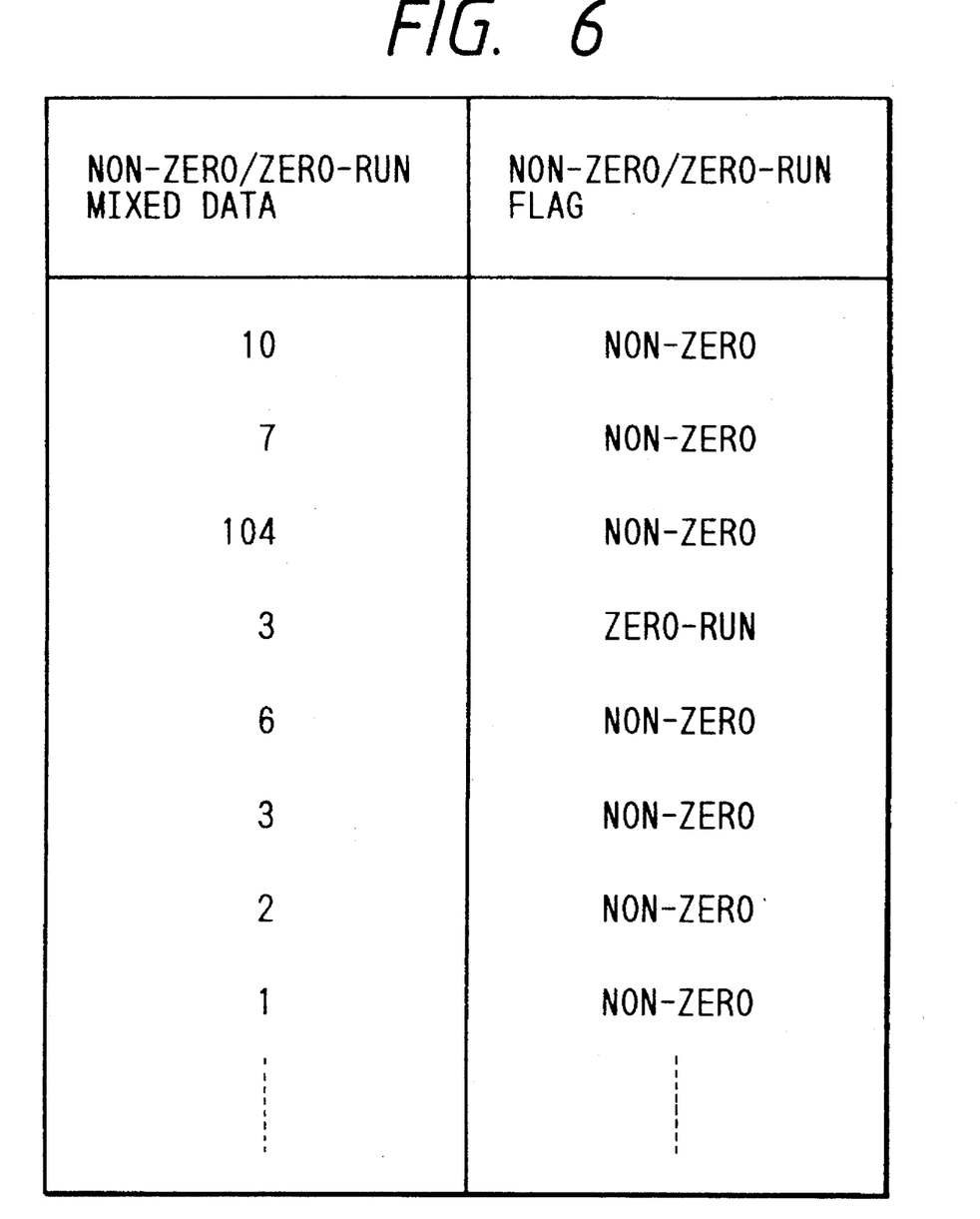
FIG. 6 is a view showing the correspondence between the non-zero/zero-run flags and the encoded data.

Input data shown in FIG. 4B are encoded by the combination of non-zero/zero-run mixed data and non-zero/zero-run flag shown in FIG. 5, and encoded data shown in FIG. 6 can be decoded, by the variable-length decoding circuit shown in FIG. 3, with timings shown in FIGS. 4A to 4G.

However, the conventional configuration explained above has been associated with the following drawback.

In case the zero-run data vary to a value larger than the number of clock signals for processing the remaining DCT block, or the non-zero data vary to zero-run data, due to an error on the transmission channel prior to the detection of the EOB code, the error propagates to the next DCT block, in case of the conventional variable-length decoding circuit as shown in FIG. 3, whereby the decoded image is aberrated, for example in the position on the image frame.

SUMMARY OF THE INVENTION

In consideration of the foregoing, an object of the present invention is to provide a decoding circuit in which an error in the data does not propagate to a succeeding image.

The above-mentioned object can be attained, according to the present invention, by a decoding apparatus comprising:

receiving means for receiving a variable-length code;

decoding means for decoding the variable-length code in synchronization with a predetermined timing signal, and generating run-length data;

counting means for counting the timing signal; and output means for releasing non-run-length data instead of releasing the run-length data, according to the result of counting of said counting means.

Another object of the present invention is to precisely decode variable-length encoded data. still another object of the present invention is to provide a decoding method suitable for block encoding.

Still another object of the present invention is to provide a decoding apparatus suitable for high-speed processing.

Still other objects of the present invention, and the features thereof, will become fully apparent from the following description, to be taken in conjunction with the attached drawings, and from the appended claims.

DETAILED DESCRIPTION OF THE PREFERRED EMBODIMENTS

Now the present invention will be clarified in detail by an embodiment thereof shown in the attached drawings.

Figure 1:
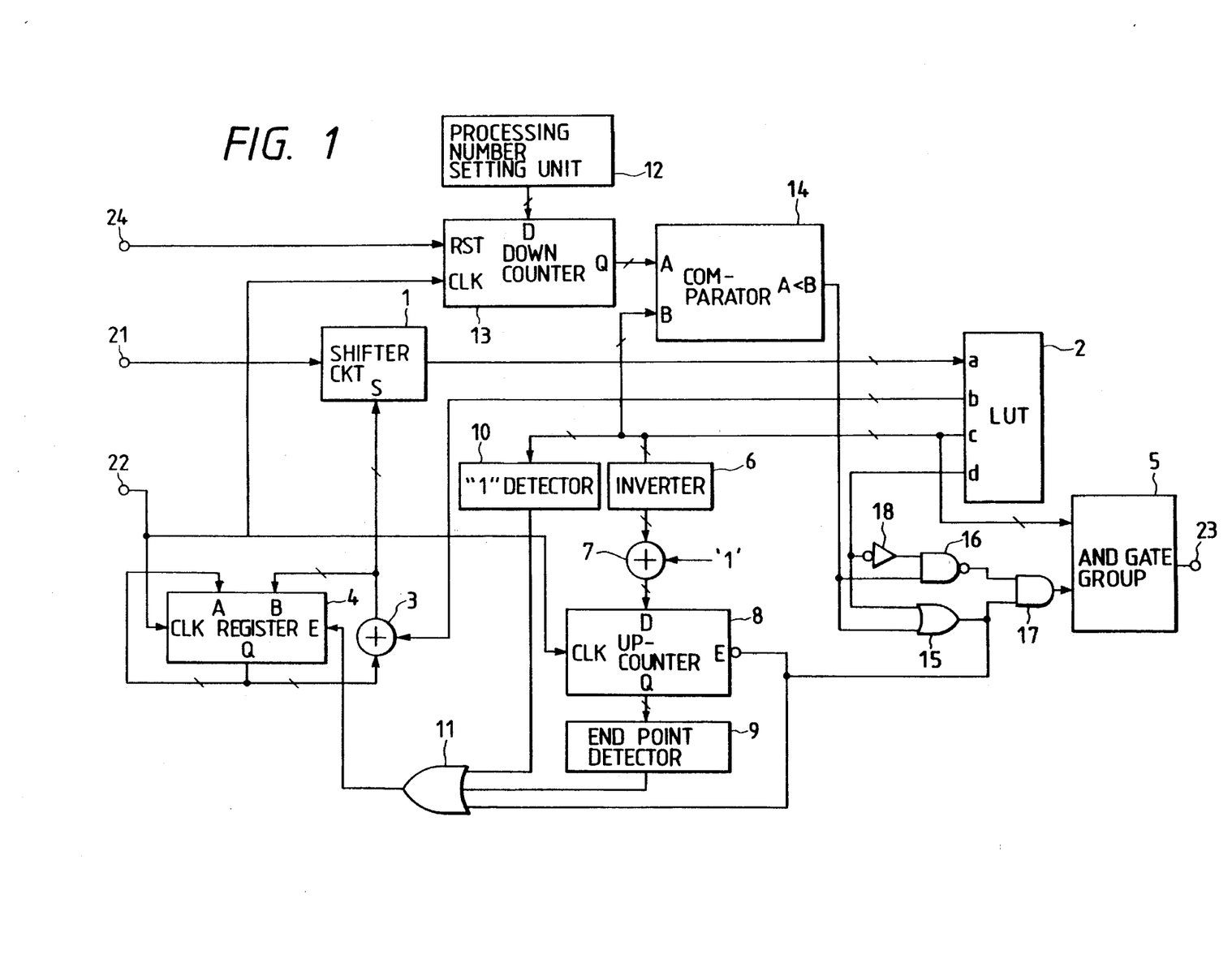
FIG. 1 is a block diagram of a variable-length decoding circuit embodying the present invention.

FIG. 1 is a block diagram showing the configuration of a variable-length decoding circuit embodying the present invention.

Referring to FIG. 1, a data input terminal 21 receives data, in the form of a word of a predetermined bit width, including codes from two bits at minimum to the maximum code bit length, encoded in the B2 code system.

An input terminal 22 receives the clock signal, and a data output terminal 23 releases the variable-length decoded data.

The B2 code data, entered from the data input terminal 21, are supplied to a shifter circuit 1, and are released therefrom with a shift to the leading bit of the B2 code. The shifter circuit 1 is provided with an input terminal S for entering the shift amount.

The output of the shifter circuit 1 is supplied to a terminal a of a look-up table (LUT) 2, of which a terminal b releases the B2 code length, while a terminal c releases non-zero/zero-run mixed data, and a terminal d releases a non-zero/zero-run flag. Said LUT 2 is composed of a ROM, a RAM or a logic circuit.

There are also provided an adder 3 and a register 4. The B2 code length released from the LUT 2 and the cumulatively consumed bit number of the B2 code lengths, until the immediately preceding clock signal, stored in said register 4, are supplied to and added in the adder 3. The cumulative sum released from the adder 3 is supplied to the terminal S of the shifter circuit 1.

An AND gate group 5 transmits the non-zero/zero-run mixed data, released from the LUT 2, for releasing from the data output terminal 23, in case the non-zero/zero-run flag from the LUT 2 is at the H-level.

In case the non-zero/zero-run flag is at the L-level, the data from the output terminal 23 are made all zero by the AND gate group 5. In this state the non-zero/zero-run mixed data indicate the zero-run value, which is subjected to bit inversion by an inverter 6, then addition of "1" by an adder 7, and supplied to a terminal D of an up-counter 8.

The up-counter 8 effects an up-counting operation by the clock signal supplied to a terminal C, in case the non-zero/zero-run flag supplied to the terminal E is at the L-level. The output of said up-counter 8 is supplied to an end detector 9.

The output (zero period end flag) of the end detection circuit 9, the result of detection for the zero-run value "1" from a "1" detector 10, and the non-zero/zero-run flag are subjected to logic summation in an OR gate 11, of which output is supplied to a terminal E of the register 4.

In case the terminal E is at the H-level, the register 4 selects a terminal A for input, and renews the cumulatively consumed bit number, but, in case said terminal E is at the L-level, a terminal B is selected and the cumulative bit number is retained.

A reset signal supplied to a reset input terminal 24 can initialize the decoding process. For example, when an 8×8 DCT (discrete cosine transformation) block is formed, the reset signal is entered at every 64 clock pulses.

There are also provided a process number setting unit 12 and a down-counter 13. If the decoding is to be conducted, for example, on an 8×8 DCT block, a process number "63" is set in the process number setting unit 12, for example by DIP switches. When a reset signal is supplied to a terminal RST of the down-counter 13, said down-counter 13 receives, from a terminal D, the process number set in said process number setting unit 12, then counts down said process number in synchronization with the clock pulses entered from a terminal CLK and releases the count from a terminal Q.

A comparator 14 receives, at a terminal A, the count released from the down-counter 13, and, at a terminal B, the non-zero/zero-run mixed data released from the LUT 2, and releases an A<B flag of H-level, in case the input data at the terminal A is smaller than that at the terminal B.

The A<B flag from the comparator 14 is supplied to an OR gate 15, which, if said flag is at H-level, forcedly shifts the non-zero/zero-run flag from the LUT 2 to the H-level, thereby causing the up-counter 8 and the OR gate 11 to handle zero-run data as non-zero data.

The A<B flag from the comparator 14 is at the same time supplied to a NAND gate 16, which also receives the non-zero/zero-run flag inverted by an inverter 18 and which releases the negative logic product of the A<B flag and the inverted non-zero/zero-run flag.

The output of the NAND gate 16 and the output of the OR gate 15 are subjected to logic multiplication in an AND gate 17, of which output is supplied to the AND gate group 5 whereby the zero-run data is replaced by non-zero data "0".

FIGS. 2A to 2G are timing charts showing an example of the function of the present embodiment.

Figure 2A:
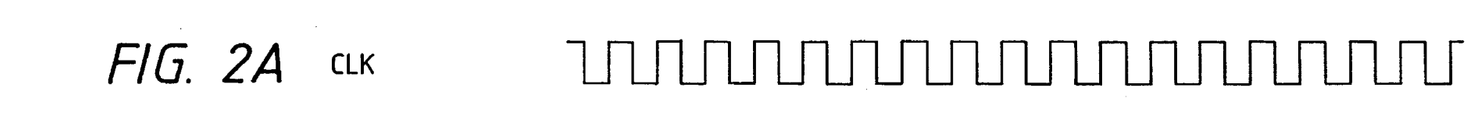
FIGS. 2A to 2G are timing charts showing an example of the function of said embodiment.
Figure 2B:
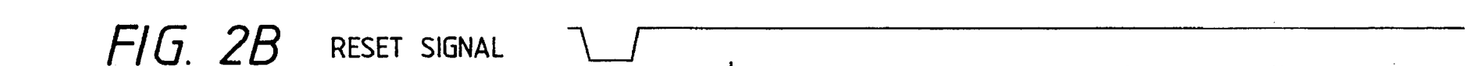
Figure 2C:
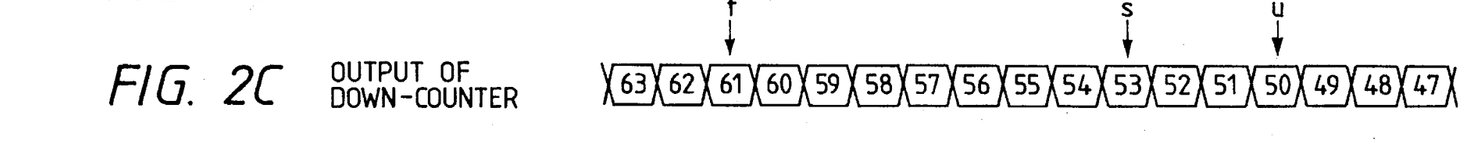
Figure 2D:
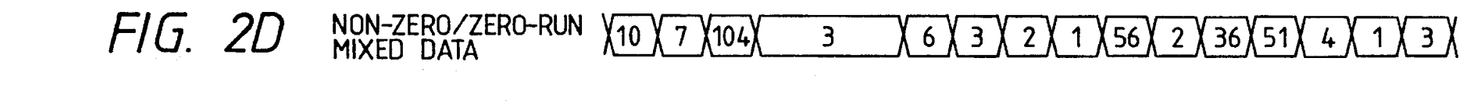
Figure 2E:
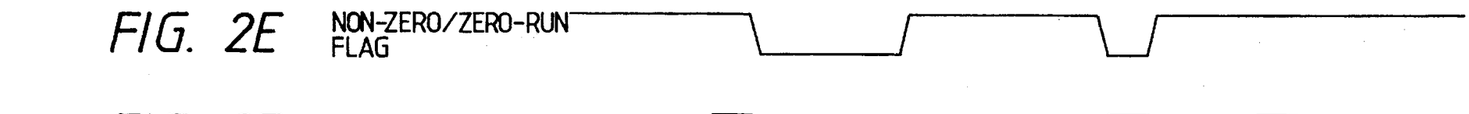
Figure 2F:
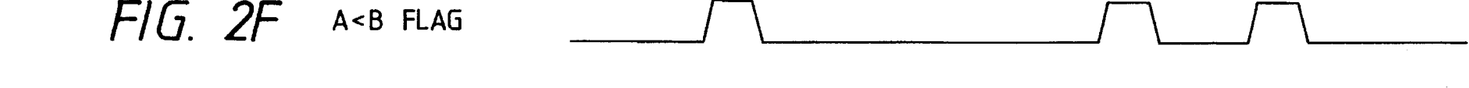
Figure 2G:
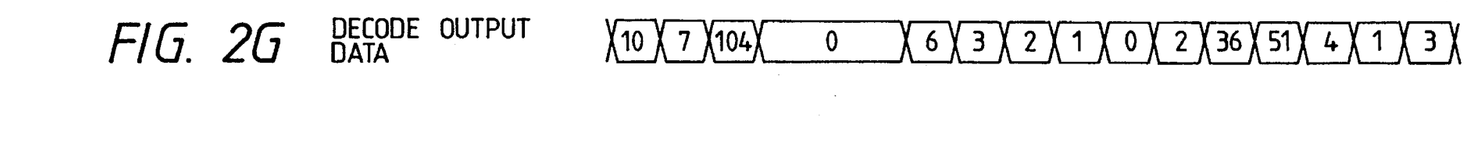

In FIGS. 2A to 2G, FIG. 2A shows the clock signal; FIG. 2B the reset signal; FIG. 2C the output of the down-counter 13; FIG. 2D the non-zero/zero-run mixed data; FIG. 2E the non-zero/zero-run flag; FIG. 2F the A<B flag; and FIG. 2G the output from the data output terminal 23.

At timings t and u shown in FIGS. 2A to 2G, the non-zero/zero-run data becomes larger than the count of the down-counter 13, but the A<B flag is disregarded because of the non-zero state.

Also if a data error occurs in the transmission channel at a timing s whereby the zero-run data varies to a value larger than the number of clock pulses required for processing the remaining DCT block prior to the detection of the EOB code, the A<B flag is shifted to the H-level, thereby forcedly shifting the non-zero/zero-run flag to the non-zero state, and replacing the zero-run data with the non-zero data "0".

As explained in the foregoing, in the present embodiment, the clock pulses are counted from the initialization of the decoding process, and the obtained count is compared with the decoded run length. If, in said comparison, the decoded run length is larger than the number of clock pulses remaining before the next initialization of the decoding process, the decoded run length is replaced by "0" or by another non-run-length value. Consequently, even in case the zero-run data eventually varies to a value larger than the number of clock pulses required for processing the remaining DCT block prior to the detection of the EOB code, due to a data error occurring on the transmission channel, the non-zero/zero-run flag is forcedly shifted to the non-zero state and the zero-run data is replaced by the non-zero data "0", so that said data error does not propagate to the next DCT block.

The present invention is particularly effective in the application in a decoding apparatus of so-called adaptive discrete cosine transformation (ADCT) system. The present invention is applicable, not only in the encoding of a still image but also in the encoding of a moving image.

The foregoing description has been limited to the decoding of a B2 code system employing an 8×8 DCT, but the present invention is not limited to such embodiment and is naturally applicable easily to the decoding of other non-block encoding systems, for example variable-length encoding systems such as run-length encoding, or of other encoding systems than the B2 code.

The present invention is applicable to a system composed of plural equipment such as a computer and a printer, or to a system composed of a single equipment, such as television set.

Also the present invention is naturally applicable to a case in which the decoding is achieved by supplying a computer with a program.

As explained in the foregoing, the present invention can provide a decoding circuit in which the data error does not propagate to succeeding images.

It is to be noted that the present invention is not limited by the above-explained embodiment but is subjet to various modifications and variations within the scope and spirit of the appended claims.

What is claimed is:

1. A decoding apparatus comprising:

receiving means for receiving a variable-length code which represents run-length data or non-run-length data in a block having a predetermined size; and decoding means for decoding the variable-length code in synchronization with a predetermined timing signal, and generating run-length data or non-run-length data, wherein said decoding means includes, counting means for counting the timing signal; and output means for releasing non-run-length data instead of the run-length data, based on a result of counting by said counting means in order to prevent a decoding error from spreading over another block.

2. A decoding apparatus according to claim 1, wherein said output means is adapted to release the non-run-length data, in case the run-length data is larger than said result of counting.

3. A decoding apparatus according to claim 1, wherein said non-run-length data is "0".

4. A decoding apparatus according to claim 1, wherein said counting means is adapted to effect the counting operation for every block of a predetermined size.

5. A decoding apparatus according to claim 4, wherein the size of said block is related to the size of an orthogonal transformation.

6. A decoding method comprising:

a receiving step for receiving a variable-length code which represents run length data or non-run-length data in a block having a predetermined size; and a decoding step for decoding the variable-length code in synchronization with a predetermined timing signal, and generating run-length data or non-run-length data, wherein said decoding step includes, a counting step for counting the timing signal, and an output step for releasing non-run-length data instead of the run-length data, based on a result of counting in said counting step in order to prevent a decoding error from spreading over another block.

7. A decoding method according to claim 6, wherein said output step is adapted to release the non-run-length data in case the run-length data is larger than said result of counting.

8. A decoding method according to claim 6, wherein the non-run-length data is "0".

9. A decoding method according to claim 6, wherein the counting in said counting step is executed for every block of a predetermined size.

10. A decoding method according to claim 9, wherein the size of said block is related to the size of an orthogonal transformation.

* * * * *

UNITED STATES PATENT AND TRADEMARK OFFICE
CERTIFICATE OF CORRECTION

PATENT NO. : 5,565,991

DATED : October 15, 1996

INVENTOR(S) : ENARI

It is certified that error appears in the above-identified patent and that said Letters Patent is hereby corrected as shown below:

On the title page, item [56]:

<u>REFERENCES CITED, U.S. PATENT DOCUMENTS</u>

Insert: "5,267,036 11/1993 Habraken et al.
5,351,131 9/1994 Nishino et al."

Signed and Sealed this

Twenty-second Day of April, 1997

Attest:

BRUCE LEHMAN

*Commissioner of Patents and Trademarks*

*Attesting Officer*